March 16, 1965     S. BAHRS     3,174,067
CONSTRUCTION FOR PROJECTION LAMPS ELIMINATING
UNDESIRED INFRARED RADIATION
Filed July 17, 1961
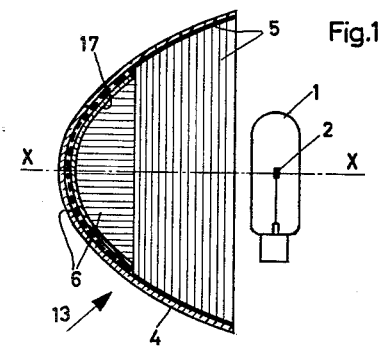
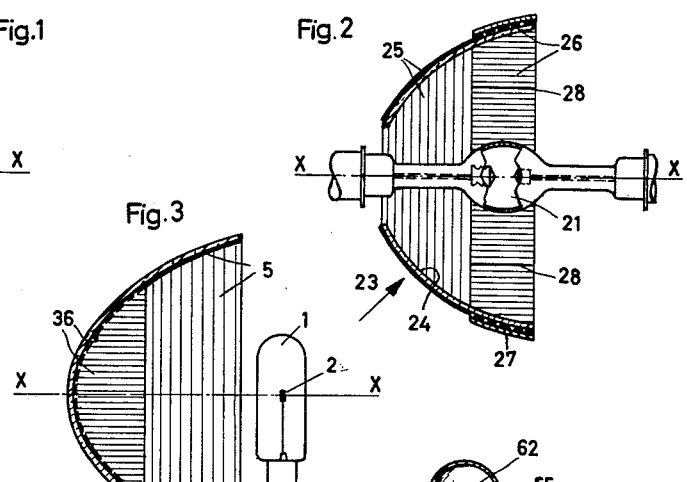
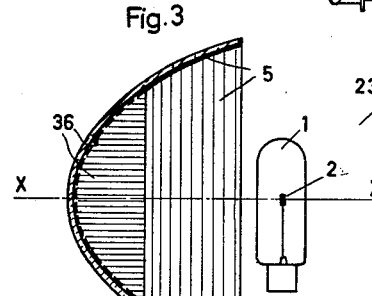
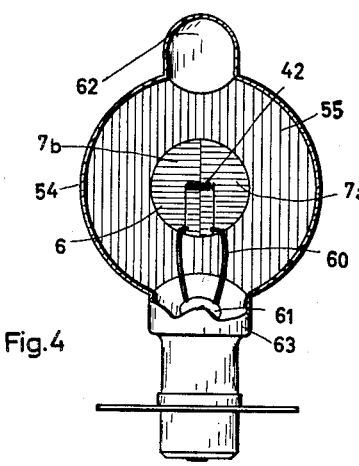
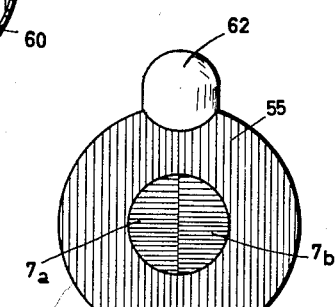
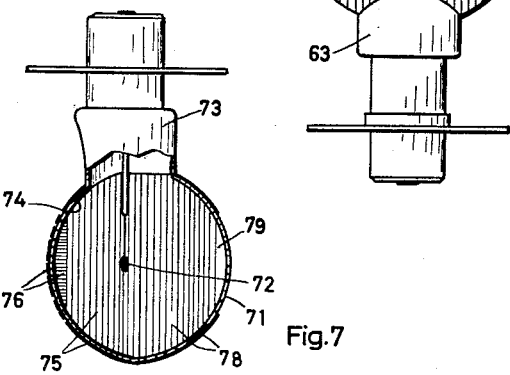
INVENTOR.

United States Patent Office 3,174,067
Patented Mar. 16, 1965

3,174,067
CONSTRUCTION FOR PROJECTION LAMPS ELIMINATING UNDESIRED INFRARED RADIATION
Siegfried Bahrs, Heidenheim (Brenz), Germany, assignor to Patent - Treuhand - Gesellschaft für elektrische Glühlampen m.b.H., Munich, Germany
Filed July 17, 1961, Ser. No. 124,539
Claims priority, application Germany, July 21, 1960,
P 16,894
1 Claim. (Cl. 313—110)

This invention relates to a construction applicable to still and motion picture projectors and is particularly concerned with means provided to prevent any heat radiations from striking the picture film in projectors.

Constructions for projector lamps are known in which a concave radiation-concentrating reflector arranged behind the light source is provided with a coating which reflects visible light emitted by the light source, which is, however, transmissive for infrared radiation emitted by the light source. Such a coating consists of a basic layer and of interference filter beds. For the basic layer there are used germanium, silicon, antimony sulphide or selenium which have high reflecting power for visible radiation and great transmissivity for infrared radiation. Interference filter beds increase the reflecting power of a composite coating. They consist of a number of films one above the other each of which having a thickness of a quarter only or of a little odd multiple of a quarter, respectively, of a wavelength, this latter being, suitably, chosen from the range of maximum radiation intensity in the visible portion of the light source used. It is quite obvious that such filter layers must be made very carefully because they do not act in the desired manner if the thickness of the single films is not made very uniform and accurate.

Now it has been found that it is quite difficult to apply such interefence filter beds to curved surfaces. If the surface is very much curved and also in case of a larger curved surface it is very difficult to apply the films to the entire surface with uniform thickness. It is also very difficult to produce such films on a plurality of objects curved in the same manner and to obtain equal quality on all pieces.

It is an object, therefore, of the present invention to provide an improved construction for projection lamps which will reduce greatly the present difficulties.

It is an other object of the invention to provide a construction for projection lamps including means to prevent any heat radiations from striking the picture film in projectors and which may be produced much simpler than hitherto in great quantities whereby all pieces have equal quality.

It is a further object of the present invention to provide a construction for projection lamps including means to prevent any heat radiations from striking the picture film in projectors, in which these means are adapted to type, arrangement and light distribution of the light sources used.

In accordance with the invention, the above mentioned objects are achieved by a construction for projection lamps wherein substantially one concave radiation-concentrating specularly reflecting surface comprises adjacent portions, one of which is highly reflective to visible light and highly transmissive to infrared radiation while the other of said portions is highly reflective to either visible light and infrared radiation. For that portion being highly reflective to visible light and highly transmissive to infrared radiation, such a portion of the concave radiation-concentrating reflecting surface is chosen on which a very high percentage of radiation falls which is emitted by the light source. If the light source is, for instance, a high-pressure gaseous discharge lamp and the electrode rods are arranged in the optical axis of the reflecting surface, then that zone of the reflecting surface on which radiation falls in maximum intensity, lies in the neighborhood of a plane passing through the discharge vertically to the optical axis. It is remote from the summit of the reflector and constitutes a substantially annular zone.

If the light source is, however, a flat wire coil through which the optical axis passes and both the broadsides of which are arranged vertically to the optical axis of the reflecting surface, a summit zone of the reflecting surface is that zone on which radiation of the flat coil falls in maximum intensity. The visible light-reflecting and infrared radiation-transmitting zone is chosen either so small or is divided into so small parts that it is made possible to apply interference filter layers to such proportionately not much curved small parts in good and uniform quality with not too high expense. The zone is, preferably, subdivided into parts of equal shape and equal size. It proved favourable to make the surface of the parts to which the coating reflecting visible light and transmitting infrared radiation shall be applied, continuous and not greater than about 10 cm.².

Further objects and advantages of the invention will appear from the following description of species thereof, the novel features being particularly pointed out in the appended claim.

In the drawings like reference characters denote like parts throughout:

FIG. 1 is a partial section through the optical axis of a construction for projection lamps embodying one form of the invention;

FIG. 2 is a partial section similar to FIG. 1 of a construction for projection lamps illustrating a second embodiment of the invention;

FIG. 3 is a partial section similar to FIGS. 1 and 2 of a construction for projection lamps illustrating a third embodiment of the invention;

FIG. 4 shows a construction for projection lamps true to scale in front view, partly in section, embodying a preferred form of the invention;

FIG. 5 is a longitudinal section through the optical axis of the construction for projection lamps shown in FIG. 4;

FIG. 6 is a rear elevation of the construction for projection lamps shown in FIGS. 4 and 5;

FIG. 7 is a longitudinal section through the optical axis of a construction for projection lamps illustrating a fifth embodiment of the invention.

In all the figures metallic reflecting surfaces are marked by vertical hatching and those surfaces reflecting visible light and transmitting infrared radiation are marked by horizontal hatching whether they are directly visible or they shine through a glass wall. These coatings are shown in the figures as well as surfaces as in section. The coatings shown in section are represented by a solid line in case of metallic coatings and by a dotted line in case of reflecting coatings transmitting infrared radiation.

In FIG. 1, the numeral of reference 1 shows a projection lamp. The filament 2 lies in one focussing point of the ellipsoidal reflector 13 and the second focussing point lies nearly in the image aperture of the projector. The filament 2 consists of a flat coil both the broadsides of which are arranged vertically to the optical axis XX. The ellipsoidal reflector 13 consists of a glass basis 4, a metallic reflecting coating 5 on a substantially annular zone extending to the periphery of the reflector and of a glass bowl 17 provided with a coating 6 reflecting visible light and transmitting infrared radiation. The metallic coating 5 on the substantially annular zone leaves blank an aperture in the summit zone of the glass basis 4 which aperture is covered on the concave side with the exactly fitting bowl 17. The bowl 17 is fastened to the glass basis 4 by means of an adhesive. The metallic reflecting coating 5 and the coating 6 reflecting visible light and transmitting infrared radiation constitute together substantially one concave radiation-concentrating reflecting surface of ellipsoidal configuration.

The coating 6 is located within a range of highest radiation intensity of lamp 1 so that a considerable percentage of the infrared radiation emitted by lamp 1 and falling on the ellipsoidal reflecting surface passes through glass bowl 17, coating 6 and glass basis 4 and is in this way filtered out of the projection beam. Experiments have shown that this decrease in infrared radiation contained in the projection beam is quite sufficient to prevent any bad overheating of the picture film. The visible light emitted by lamp 1 and falling on the ellipsoidal reflecting surface is concentrated by reflection on coating 6 or on surface 5, respectively, in a projection beam falling onto the picture film.

In FIG. 2, the numeral of reference 21 designates a high-pressure xenon discharge lamp of well known design. Its base ends are not shown in the drawing because design and supporting system of a high-pressure lamp are no object of the present invention. The electrodes of high-pressure lamp 21 are arranged in the optical axis XX of the ellipsoidal reflector 23 in such a manner that a focussing point of the ellipsoidal reflector 23 lies in the discharge arc. The second focussing point lies nearly in the image aperture of the projector. The ellipsoidal reflector 23 consists of a glass basis 24 with a metallic reflecting coating 25 and a shell 27 provided with a coating 26 reflecting visible light and transmitting infrared radiation. The reflector 23 has a central aperture for lamp 21. The metallic coating 25 is located on a substantially annular zone directly adjacent to the aforesaid aperture, of the glass basis 24. The shell 27 is covering and fitting closely into the uncoated, also substantially annular zone of the glass basis. The metallic reflecting coating 25 and the coating 26 constitute together substantially one ellipsoidal surface. Also in this construction, the coating 26 reflecting visible light and transmitting infrared radiation lies in a range of highest radiation intensity of the high-pressure xenon discharge lamp 21 so that a considerable percentage of infrared radiation emitted by lamp 21 and falling on ellipsoidal reflector passes througth the glass basis 24, the coating 26 and the glass shell 27 and is in this way filtered out of the projection beam. Any bad overheating of the picture film is prevented thereby.

The shell 27 is composed of four parts in such a manner that the separating lines 27 between the parts have equal distance from each other and that each separating line froms a plane with the optical axis. By this means all parts have equal shape and equal size.

In FIG. 3, the numeral of reference 1 designates a projection lamp similar to that shown in FIG. 1 arranged in respect of the optical axis XX like that shown in FIG. 1. The glass basis 4 and the metallic reflecting coating 5 of the ellipsoidal reflector 33 correspond to the glass basis 4 and and to the metallic coating 5 of the ellipsoidal reflector shown in FIG. 1. The aperture in the summit zone of glass basis 4 is provided with a coating 36 reflecting visible light and transmitting infrared radiation. Also in case of this construction, that zone being provided with the infrared-transmisisve coating 36 lies within the range of maximum radiation intensity of flat coil 2 so that a high percentage of infrared radiation emitted by coil 2 is filtered out of the projection beam and bad overheating of the picture film is prevented.

In the projection lamp shown in FIGS. 4, 5 and 6 the rear wall 54 of the envelope constitutes the ellipsoidal reflector. The filament 42 is a flat coil being arranged in respect of the optical axis XX in just the same manner as coil 2 in FIGS. 1 and 3. The front wall 51 of the envelope has sperical shape and the centre of this spherical surface coincides with the near focussing point of the ellipsoidal surface of the rear wall 54 of the envelope, said focussing point lying in the filament. In the middle of the spherical front wall 51 there is provided an aperture 59 through which a projection beam may pass. Above the filament 42 being supported in known manner by current inleads 60 sealed in a stem press 61, the envelope has a dome-like extension 62. The ellipsoidal rear wall 54 of the envelope is provided with a substantially annular metallic coating 55 adjoining the metallic coating 58 of the front wall 51. The summit zone of the ellipsoidal rear wall 54 of the envelope is covered by the bowl 7. The bowl 7 consists of two halves 7a and 7b which are composed after having applied the coating 6 to the concave side of the bowl. The coating consists of a basic layer of germanium and of interference filter layers highly reflective to visible light and highly transmissive to infrared radiation. The composed bowl 7 may be fastened to the enevlope by means of an adhesive or, for instance, by means of a holding device shown in FIG. 5 which consists of a frame 64 and two tapes 65 put around the dome-like extension 62 or the envelope neck 63, respectively, by which the frame is held fast in its position.

In the projection lamp shown in FIG. 7 the ellipsoidal reflector of the rear wall 74 is, while the other envelope dimensions are maintained, greater than in case of the lamp shown in FIGS. 4, 5 and 6 because it has no dome-like extension and is provided with a neck 73 which is not cylindrical as that shown in FIGS. 4, 5 and 6 but is flattened on the back. This lamp is operated in downright burning position only, that means with the base above. The filament 72 is equal to that shown in FIGS. 1, 3, 4, 5 and 6. Because the dome-like extension is omitted, also the spherical reflecting surface 78 on the bulb front wall 71 is greater than that shown in FIGS. 4, 5, and 6. The numeral of reference 79 designates the aperture in the front wall 71 for a projection beam. The summit zone of the ellipsoidal rear wall 74 of the envelope is provided with a coating 76 reflective to visible light and transmissive to infrared radiation whereas the remaining zone of the ellipsoidal rear wall 74 is provided with a metallic reflecting coating 75.

It is suitable to provide the metallic reflecting coatings 55 and 58 on the outer side of the envelope and shown in FIGS. 4, 5, and 6 with a protective coating which may also cover the dome-like extension 62 and the bulb neck 63. The coatings 75, 76 and 78 shown in FIG. 7 may also be provided with a protective coating extending also to the bulb neck 73.

The incandescent projection lamps shown in the drawings contain a gas filling at a pressure of somewhat lower or higher than one atmosphere. Argon, nitrogen, krypton, xenon may be used as the filling gas and the gas filling may contain in order to obtain special effects also other additions as, for instance, hydrogen and iodine. The lamps may also contain one of the well known getter materials.

The lamps may contain instead of a coiled filament also a tungsten wire enveloped by a thinner wire as the filament. Instead of single-coiled tungsten filament there may be provided also a coiled coil. The filament may consist also of several coil legs arranged, suitably, in parallel with each other.

The apertures 59 and 79 through which a projection beam may pass may be provided with a coating reflective to infrared radiation and transmissive to visible light so that the percentage of infrared radiation in the projection beam is even more reduced.

Instead of an ellipsoidal form there may be provided for the reflectors 13, 23, and 33 or the bulb rear walls of the lamps shown in FIGS. 4, 5, 6, and 7, respectively, also any other form suitable for any desired ray bundling, preferably a symmetrical one with respect to rotation.

*Numerals of reference*

1: projection lamp
2: filament
4: glass base
5: metallic reflecting coating
6: coating reflective to visible light and transmissive to infrared radiation
7: bowl
13: ellipsoidal reflector
17: bowl
21: high-pressure xenon discharge lamp
23: ellipsoidal reflector
24: glass base
25: metallic reflecting coating
26: coating reflective to visible light and transmissive to infrared radiation
27: shell
28: separating line between shell parts
33: ellipsoidal reflector
36: coating reflective to visible light and transmissive to infrared radiation
42: filament
51: envelope front wall
54: envelope rear wall
55: metallic reflecting coating on the rear wall
58: metallic reflecting coating on the front wall
59: light exit aperture
60: current inleads
61: stem press
62: dome-like extension
63: bulb neck
64: frame for bowl
65: tapes for frame
71: envelope front wall
72: filament
73: bulb neck
74: envelope rear wall
75: metallic reflecting coating on the rear wall
76: coating reflective to visible light and transmissive to infrared radiation
78: metallic reflecting coating on the front wall
79: light exit aperture

What is claimed is:

A construction for projection lamps comprising, in combination, a coiled filament, a sealed glass envelope extending about said filament and specularly reflecting means carried by said envelope, the front wall of said envelope being of spherical configuration and the rear wall of said envelope being of ellipsoidal configuration, the centre of said spherical front wall approximately coincides with the near optical focus of said ellipsoidal rear wall, said coiled filament being approximately located at said centre and said focus, the main axis of said ellipsoidal wall coinciding with the optical axis of said reflecting means, said front wall of said envelope carrying a substantially annular reflecting surface being highly reflective to either visible light and infrared radiation and forming a window in said front wall through which a projection beam may pass, said rear wall of said envelope forming one ellipsoidal radiation-concentrating surface being divided into adjacent areas one of which is highly reflective to visible light and highly transmissive to infrared radiation, while the other of said areas is highly reflective to either visible light and infrared radiation, said rear wall carrying a substantially annular reflecting surface representing said area which is highly reflective to either visible light and infrared radiation and forming a window in the summit zone of said ellipsoidal wall, said window being covered by a bowl fitting to said window, said bowl having a coating which fits to said window of said rear wall and which represents said area which is highly reflective to visible light and highly transmissive to infrared radiation.

References Cited by the Examiner
UNITED STATES PATENTS

| | | | |
|---|---|---|---|
| 1,342,894 | 6/20 | Bugbee | 313—112 X |
| 2,552,185 | 5/51 | Koch | 88—106 |
| 2,798,943 | 7/57 | Prideauz | 88—106 X |

DAVID J. GALVIN, *Primary Examiner.*

ARTHUR GAUSS, GEORGE N. WESTBY, *Examiners.*